(12) United States Patent
Otenko

(10) Patent No.: US 9,542,236 B2
(45) Date of Patent: *Jan. 10, 2017

(54) EFFICIENCY SEQUENCER FOR MULTIPLE CONCURRENTLY-EXECUTING THREADS OF EXECUTION

(75) Inventor: Oleksandr Otenko, Berkshire (GB)

(73) Assignee: Oracle International Corporation, Redwood Shores, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 13/340,672

(22) Filed: Dec. 29, 2011

(65) Prior Publication Data

US 2013/0174166 A1    Jul. 4, 2013

(51) Int. Cl.
| | |
|---|---|
| G06F 9/455 | (2006.01) |
| G06F 9/46 | (2006.01) |
| G06F 9/52 | (2006.01) |
| G06F 9/48 | (2006.01) |

(52) U.S. Cl.
CPC ............ *G06F 9/526* (2013.01); *G06F 9/4843* (2013.01); *G06F 9/52* (2013.01)

(58) Field of Classification Search
CPC .......... G06F 9/4881; G06F 9/52; G06F 9/461
USPC ............................................ 718/1, 102, 108
See application file for complete search history.

(56) References Cited

U.S. PATENT DOCUMENTS

| | | | |
|---|---|---|---|
| 5,313,641 A * | 5/1994 | Simcoe et al. ................ 710/242 |
| 5,706,515 A | 1/1998 | Connely et al. | |
| 6,026,427 A | 2/2000 | Nishihara et al. | |
| 6,272,517 B1 * | 8/2001 | Yue et al. ..................... 718/102 |
| 6,697,834 B1 * | 2/2004 | Dice ............................. 718/102 |
| 6,721,775 B1 | 4/2004 | Fagen et al. | |
| 6,912,712 B1 * | 6/2005 | Myung .................. G06F 9/463 |
| | | | 718/100 |
| 7,089,340 B2 | 8/2006 | Penkovski et al. | |
| 7,406,690 B2 | 7/2008 | Jenkins et al. | |
| 7,797,683 B2 | 9/2010 | Hammarlund et al. | |
| 7,861,042 B2 * | 12/2010 | Larson et al. ................ 711/152 |
| 8,341,636 B2 * | 12/2012 | Wilhelm, Jr. ................ 718/104 |
| 8,578,380 B1 * | 11/2013 | Adams et al. ................ 718/100 |

(Continued)

OTHER PUBLICATIONS

Francis "Page 1Thread Manager Module Specification," MIT 64-30110.1701 Rev. D (Mar. 5, 1993).

(Continued)

*Primary Examiner* — Phil Nguyen
(74) *Attorney, Agent, or Firm* — Kilpatrick Townsend & Stockton LLP

(57) ABSTRACT

Techniques are disclosed for efficiently sequencing operations performed in multiple threads of execution in a computer system. In one set of embodiments, sequencing is performed by receiving an instruction to advance a designated next ticket value, incrementing the designated next ticket value in response to receiving the instruction, searching a waiters list of tickets for an element having the designated next ticket value, wherein searching does not require searching the entire waiters list, and the waiters list is in a sorted order based on the values of the tickets, and removing the element having the designated next ticket value from the list using a single atomic operation. The element may be removed by setting a waiters list head element, in a single atomic operation, to refer to an element in the list having a value based upon the designated next ticket value.

15 Claims, 9 Drawing Sheets

(56) References Cited

U.S. PATENT DOCUMENTS

| | | | |
|---|---|---|---|
| 8,667,236 B2* | 3/2014 | Phelps et al. | 711/162 |
| 2002/0114338 A1* | 8/2002 | Craig et al. | 370/401 |
| 2002/0161926 A1* | 10/2002 | Cameron | 709/245 |
| 2007/0300226 A1* | 12/2007 | Bliss | 718/100 |
| 2008/0098180 A1* | 4/2008 | Larson et al. | 711/150 |
| 2010/0115195 A1* | 5/2010 | Pong | 711/104 |
| 2010/0250809 A1 | 9/2010 | Ramesh et al. | |
| 2011/0072241 A1 | 3/2011 | Chen et al. | |

OTHER PUBLICATIONS

Reed et al. "Synchronization and Event Counters" Communications of the ACM vol. 22, pp. 115-123 (Feb. 1979).
Zerzelidis et al. "A framework for flexible scheduling in the RTSJ," ACM Transactions on Embedded Computing Systems vol. 10, pp. 3:1-3:44 (Aug. 2010).

* cited by examiner

EFFICIENCY SEQUENCER FOR MULTIPLE CONCURRENTLY-EXECUTING THREADS OF EXECUTION

BACKGROUND

Embodiments of the present invention relate generally to multiprocessors and concurrency in computer systems, and more particularly to techniques for synchronizing processing in systems that process events concurrently.

Computer systems can execute program code instructions using one or more processors that perform operations specified by the instructions. The operations can produce effects on the state of the computer, for example, by changing data stored in the computer's memory. The results produced by the instructions can depend on the state of the computer at the time the instructions are executed and on input received from sources external to the computer system. A set of program code instructions being executed on a computer system is referred to as a "process" or a "thread." Multiple processes and/or threads can be executed concurrently using one or more processors, so that the processes and threads execute, or at least appear to execute, simultaneously. That is, each process or thread can be executed simultaneously by a different processor, or can be executed on the same processor using a technique such as time slicing to share a single processor among multiple instruction streams. In both scenarios, computer systems can allow the different processes or threads to use a resource, such as memory, that is shared among the processes or threads.

If multiple concurrent processes or threads can access and change the same data value in memory, such as a bank balance variable, then some form of synchronization between the processes or threads is needed, because unsynchronized access to a shared resource can lead to incorrect results as multiple streams of instructions attempt to modify the same resource, e.g., the bank balance variable, at essentially the same time, with each stream expecting that there will be no other modifications to the resource. For example, two different threads may execute the instructions "balance=balance+5" to add $5 to the bank balance variable. If both threads execute these instructions concurrently without synchronization, then incorrect results may occur. The correct result, after execution of both threads, is an increase of the balance by $10. However, adding $5 to the balance can actually involve multiple instructions, such as an instruction to read the balance variable followed by an instruction to add 5 to the value read from the balance variable and store the result in the balance variable. Thus, if both threads execute the first instruction before executing any further instructions, both threads will read the same initial value (e.g., 0 if the balance is initially zero), and add 5.00 to that value, which will result in both threads storing the value 5 in the balance variable, instead of one thread storing 5 and the second thread storing 10, which is the correct behavior. Executing the threads in sequence, e.g., the first thread followed by the second thread, would result in correct behavior, but may be less efficient than executing the threads concurrently. For example, if each thread executes on a corresponding processor, then both threads can be executed in essentially the same amount of time as one thread. If the threads are executed sequentially, then twice as much time may be used for their execution. Further, there are other advantages to executing multiple threads concurrently. For example, resources such as input/output devices can be used more efficiently by concurrent threads.

Therefore, it is desirable to be able to execute threads concurrently, but synchronization between the threads is needed to ensure correct execution. With synchronization, each thread can, for example, request exclusive access to the balance variable before accessing it. Thus each thread will wait until no other threads are accessing the variable before accessing it. Such mutually exclusive access to the shared resource is useful for maintaining correct behavior of concurrent programs. However, constructing concurrent programs that operate correctly and share resources efficiently can be difficult, because identifying the specific instructions that need to be protected by a synchronization technique, such as mutual exclusion, without protecting more of the program than necessary, is a complex task.

SUMMARY

In accordance with embodiments of the invention, an efficient sequencer is provided to enable multiple concurrently-executing threads of execution to correctly access shared resources such as data in memory and input/output devices. Shared resources can be accessed by critical sections of program code, e.g., code that accesses variables that are shared between the processes or threads. Execution threads request access to a critical section (or other shared resource) by presenting ticket values to the sequencer, and waiting until their request is granted before executing the critical section. The sequencer maintains a "next ticket" value that increases over time as threads complete the critical section. When one thread completes the critical section, the sequencer advances the "next ticket" value and grants any waiting request for the new "next ticket" value, thereby enabling another thread to enter the critical section.

Thus a request to access the critical section is granted by the sequencer when the "next ticket" value reaches or exceeds the number presented by the requesting thread. The "next ticket" value is advanced to a higher value when a thread requests that the value be advanced, which ordinarily occurs when the thread has completed execution of the critical section. The sequencer thus enforces the order in which the waiting requests are granted, and can provide an assurance of the order in which the threads will enter the critical section (or access a shared resource), which is useful in applications such as systems with multiple producer threads and multiple consumer threads that are to be matched. The sequencer maintains a list of waiting threads and associated ticket values. This "waiting list" is maintained in an order sorted according to the ticket values of the waiting threads in the list. The "next ticket" value represents the value of the next ticket to be granted, and corresponds to the next thread to be allowed to enter the critical section.

According to an embodiment of the present invention, a method is provided that includes receiving, by a computer system, an instruction to advance a designated next ticket value, incrementing, by the computer system, the designated next ticket value in response to receiving the instruction, searching, by the computer system, a waiters list of tickets for an element having the designated next ticket value, wherein searching does not require searching the entire waiters list, and the waiters list is in a sorted order based on the values of the tickets, and removing, by the computer system, the element having the designated next ticket value from the list using a single atomic operation.

Embodiments of the invention may include one or more of the following features. Removing the element may include setting, by the computer system, a waiters list head element, in a single atomic operation, to refer to an element in the list having a value based upon the designated next ticket value. Searching the waiters list may include identifying, by the computer system, a threshold ticket value which is the greatest ticket value in the list that is less than or equal to the designated next ticket value, wherein the searching starts at a waiters list head element, and removing the element may include setting, by the computer system, the waiters list head element, in a single atomic operation, to refer to a next element in the waiters list after a threshold element having the threshold ticket value. The tickets in the waiters list may correspond to threads, and the method may further include causing, by the computer system, a thread associated with the element having the designated next ticket value to proceed. The method may further include receiving, by the computer system, a request for a resource, the request associated with a request ticket value, storing, by the computer system, the request ticket value in the waiters list in a position in the list that maintains the sorted order of the list, and causing, by the computer system, the request to be blocked until the designated next ticket value is greater than or equal to the request ticket value.

Storing the request ticket value may include searching, by the computer system, the waiters list, starting at a waiters list head element, for an existing list element associated with an existing ticket value that is greater than the request ticket value, inserting, by the computer system, a new list element in the waiters list such that the existing list element is the next element after the new list element, and associating, by the computer system, the request ticket value with the new list element. The method may further include, when insertion of the new list element fails because of an unexpected value of a list element next field, searching, by the computer system, the waiters list starting at the waiters list head element for the existing list element associated with the existing ticket value, and retrying the insertion. The request may be associated with a thread of execution, and the method may further include associating, by the computer system, the thread of execution with the request ticket value in the waiters list.

According to an embodiment of the present invention, a system is provided that includes a processor configured to receive an instruction to advance a designated next ticket value, increment the designated next ticket value in response to receiving the instruction, search a waiters list of tickets for an element having the designated next ticket value, wherein the search does not require searching the entire waiters list, and the waiters list is in a sorted order based on the values of the tickets, and remove the element having the designated next ticket value from the list using a single atomic operation.

According to an embodiment of the present invention, a non-transitory machine-readable medium for a computer system is provided that has stored thereon a series of instructions executable by a processor, the series of instructions including instructions that cause the processor to receive an instruction to advance a designated next ticket value, instructions that cause the processor to increment the designated next ticket value in response to receiving the instruction, instructions that cause the processor to search a waiters list of tickets for an element having the designated next ticket value, wherein the search does not require searching the entire waiters list, and the waiters list is in a sorted order based on the values of the tickets, and instructions that cause the processor to remove the element having the designated next ticket value from the list using a single atomic operation.

According to an embodiment of the present invention, a method is provided that includes receiving, by a computer system, a plurality of requests for a resource, the plurality of requests associated with a plurality of request ticket values, selecting, by the computer system, one or more first requests from the plurality of requests, wherein the one or more first requests are associated with one or more request ticket values which are greater than a designated next ticket value, causing, by the computer system, the one or more first requests to wait until the designated next ticket value is greater than or equal to at least one of the one or more request ticket values, and storing, by the computer system, the one or more request ticket values in a waiters list that is sorted according to the ticket values.

Embodiments may include one or more of the following features. The method may further include: when the designated next ticket value is greater than or equal to at least one of the one or more request ticket values, causing, by the computer system, one or more of the first requests associated with one or more of the one or more request ticket values that are less than the designated next ticket value to proceed in the order that the one or more first requests appear in the waiters list. The resource may be a critical section of program code. Causing the one or more first requests to wait may include disabling, by the computer system, a current thread in which the one or more first requests were made. Storing the one or more request ticket values may include inserting, by the computer system, a list element associated with one of the one or more request ticket values into the waiters list such that the waiters list remains sorted by the ticket values associated with elements of the list.

The method may further include receiving, by the computer system, an instruction to advance the designated next ticket value, incrementing the designated next ticket value, searching, by the computer system, the waiters list to identify a threshold ticket value which is the greatest ticket value in the list that is less than or equal to the designated next ticket value, causing, by the computer system, one or more waiting requests associated with one or more lesser ticket values to proceed in the order that the one or more lesser ticket values appear in the waiters list, wherein the one or more lesser ticket values are less than or equal to the threshold ticket value, and removing, by the computer system, the one or more lesser ticket values from the waiters list.

Removing the one or more lesser ticket values from the waiters list may include removing a head element from the list. Causing one or more requests associated with one or more lesser ticket values to proceed may include enabling one or more threads of execution associated with the one or more requests. The waiters list may be associated with a head pointer that references a head element of the list, the head element having a ticket value less than the ticket values of other elements of the list, wherein the threshold ticket value is stored in a threshold list element that includes a next pointer referencing a next element in the list, removing the one or more lesser ticket values from the waiters list comprises setting the head pointer to the next element, thereby removing from the list one or more lesser list elements associated with the one or more lesser ticket values, and causing the one or more waiting requests associated with one or more lesser ticket values to proceed comprises enabling one or more threads associated with the one or more lesser list elements.

According to an embodiment of the present invention, a non-transitory machine-readable medium for a computer system is provided, the non-transitory machine-readable medium having stored thereon a series of instructions executable by a processor, the series of instructions including instructions that cause the processor to receive, from a thread of execution, a request for a resource, the request associated with a request ticket value that corresponds to the resource, instructions that cause the processor to compare the request ticket value to a designated next ticket value, instructions that cause the processor to allow the thread to continue execution when the request ticket value exceeds the designated next ticket value, and instructions that cause the processor to disable the thread of execution and insert a list element in an ordered list of waiting requests when the request ticket value does not exceed the designated next ticket value, wherein the list element is associated with the thread and with the request ticket value, and the list is ordered according to the request ticket values of the elements.

Embodiments may include one or more of the following features. The series of instructions may further include instructions that cause the processor to receive an instruction to advance the designated next ticket value by a given quantity, instructions that cause the processor to increment the designated next ticket value by the given quantity, instructions that cause the processor to search the ordered list of waiting requests to identify a list element associated with a threshold ticket value, wherein the threshold ticket value is the greatest ticket value in the list that is less than or equal to the designated next ticket value, instructions that cause the processor to enable execution of one or more threads associated with one or more list elements having ticket values less than or equal to the threshold ticket value, wherein the one or more threads are configured to resume execution in the order that their associated one or more ticket values appear in the ordered list, and instructions that cause the processor to remove the one or more list elements having ticket values less than or equal to the threshold ticket value from the ordered list.

The instructions that cause the processor to remove the one or more list elements may comprise instructions that cause the processor to remove a head element from the list. The instructions that cause the processor to search the ordered list of waiting requests may comprise instructions that cause the processor to begin the search at a head element of the list of waiting requests. The waiters list may be associated with a head pointer that references a head element of the list, the head element having a ticket value less than the ticket values of other elements of the list, wherein the threshold ticket value is stored in a threshold list element that includes a next pointer referencing a next element in the list, and the instructions that cause the processor to remove the one or list elements may include instructions that cause the processor to set the head pointer to the next element, thereby removing from the list one or more lesser list elements associated with the one or more lesser ticket values, and the instructions that cause the processor to enable execution of one or more threads may include instructions that cause the processor to enable one or more threads associated with the one or more lesser list elements.

According to an embodiment of the present invention, a system is provided that includes a processor configured to receive an instruction to advance a designated next ticket value, increment the designated next ticket value in response to receiving the instruction, search a waiters list of one or more ticket values to identify a threshold ticket value which is the greatest ticket value in the list that is less than or equal to the designated next ticket value, wherein the waiters list is sorted by the one or more ticket values, cause one or more waiting requests associated with one or more lesser ticket values to proceed in the order that the one or more lesser ticket values appear in the waiters list, wherein the one or more lesser ticket values are less than or equal to the threshold ticket value, and remove the one or more lesser ticket values from the waiters list.

Embodiments may provide one or more of the following features. To remove the one or more lesser ticket values from the waiters list, the processor may be configured to remove a head element from the list. To cause one or more requests associated with one or more lesser ticket values to proceed, the processor may be configured to enable one or more threads of execution associated with the one or more requests. The waiters list may be associated with a head pointer that references a head element of the list, the head element having a ticket value less than the ticket values of other elements of the list, wherein the threshold ticket value is stored in a threshold list element that includes a next pointer referencing a next element in the list, to remove the one or more lesser ticket values from the waiters list, the processor may be configured to set the head pointer to the next element, thereby removing from the list one or more lesser list elements associated with the one or more lesser ticket values, and to cause the one or more waiting requests associated with one or more lesser ticket values to proceed, the processor may be configured to enable one or more threads associated with the one or more lesser list elements.

The processor may be further configured to receive a plurality of requests for a resource, the plurality of requests associated with a plurality of request ticket values, select one or more first requests from the plurality of requests, wherein the one or more first requests are associated with one or more request ticket values which are greater than the designated next ticket value, cause the one or more first requests to wait until the designated next ticket value is greater than or equal to at least one of the one or more request ticket values, and store the one or more request ticket values in the waiters list, wherein the waiters list is sorted according to the ticket values in the list. The resource may include a critical section of program code.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
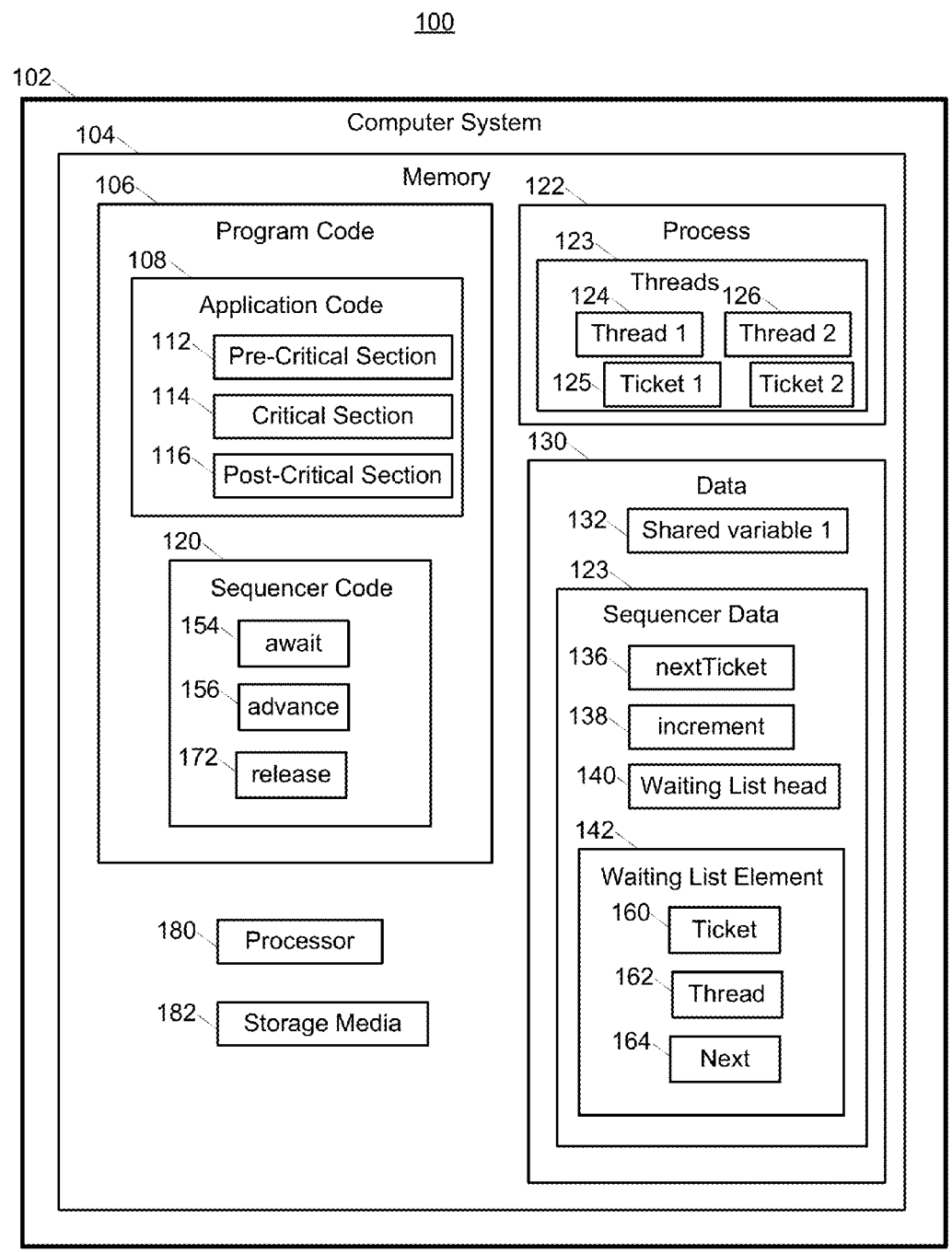
FIG. 1 is an illustrative drawing of an efficient sequencer in accordance with an embodiment of the present invention.

FIG. 1 is an illustrative drawing of an efficient sequencer system 100 in accordance with an embodiment of the present invention. The system 100 facilitates development of concurrent applications 108 by providing efficient synchronization operations that can be used by the applications 108 to coordinate access to shared data 130 stored in a computer memory 104. The shared data 130 can contain variables such as a shared variable 132. The system 100 may be a software system, a hardware system, an enterprise system, or the like. For example, the system 100 may be a complex enterprise software system and may include a database system and related products provided by Oracle Corporation™ of California. As depicted in FIG. 1, the system 100 comprises a computer system 102, which includes the memory 104, a processor 180, and storage media 182 (e.g., a disk, flash memory, or the like). The processor 180 can execute an operating system (not shown), which enables the processor to multitask by executing application code 108 in multiple processes 122 and/or threads 123 using techniques such as time slicing. In one example, each process 122 includes one or more threads 123 that can access the data 130 associated with the process 122. There can be more than one processor 180, in which case each processor can execute one of the processes 122 and/or threads 123. The processor 180 retrieves program code instructions 106 from the memory 104 and executes the instructions 106. Other arrangements of processors, processes, and/or threads are possible. For example, the operating system may provide processes 122 but not threads 123, and may provide shared data 130 between the processes 122.

The code instructions 106 executed in a process 122 or thread 124 can access the data 130, also stored in the memory 104, by reading the values of a shared variable 132 from the memory 104 and writing new values for the shared variable 132 to the locations in the memory 104 at which the variable 132 is stored. Multiple different variables can be accessed as well, but a single variable 132 is shown for purposes of explanation. Sequences of code instructions 108 are referred to herein as programs, and each program being executed is referred to as a process 122. A process 122 can include one or more of the threads 123. Each thread 123 can be understood as an executing portion of a program or an independent flow of instructions being executed. Multiple threads 123 can execute concurrently using time slicing and/or multiple processors 180. In one aspect, each of the threads 123 in a process accesses the same data 130 associated with the process, so accesses to the data 130 by threads in the same process 122 should be synchronized to avoid race conditions or other potentially incorrect behavior. Each process 122 can be isolated by the operating system from other processes 122 so that each process 122 accesses its own region of the memory 104, in which case synchronization among multiple processes may not be needed. Each process 122 can also access a shared region of memory 104 that is accessible to other processes 122, in which case access to the shared region of memory 104, such as the variable 132, should be synchronized or coordinated among the processes to avoid race conditions and other potentially incorrect behavior. The techniques described herein apply to coordination between multiple processes 122 accessing shared data 130 as well as to coordination between multiple threads 123.

A sequencer 120 provides synchronization operations 154, 156, which can be used by the application 108 to coordinate access to data 130 that is shared among multiple threads and/or processes, e.g., multiple application threads 123 producing data values as part of a long-running computation such as a simulation and storing the data values in the shared data 130, and multiple application threads consuming, i.e., reading, the data values from the shared data 130 and performing additional processing. The portion of the application code that accesses the shared data 130 is shown as the critical section 114. Although an application 108 can have many critical sections, one critical section 114 is described here for simplicity. Other critical sections in an application can be protected using the techniques described herein for the critical section 114. The application 108 also includes pre-critical section code 112, which is executed prior to execution of the critical section 114, and post-critical section code 116, which is executed after the critical section 114.

To enable applications 108 to coordinate access to the memory locations of the variables 132 in the shared data, the sequencer 120 provides an await method (i.e., operation) 154 that can be invoked by an application thread 124 prior to a critical section 114 to wait until the thread 124 can access the critical section exclusively, i.e., without any of the other threads 123 that may invoke the await method being in the critical section 114 at the same time as the thread 124. The sequencer 120 also provides an advance method 156 that can be invoked by the application thread 124 after the critical section has been executed, to allow another thread 126 to access the critical section 114. The sequencer 120 also includes a release method 172

Thus the application code 108 should invoke the await method at or near the end of the pre-critical section code 112. When invoking the await method, the application thread 124 passes a ticket number 125, which should be used by the thread 124 to uniquely identify itself, to the await method. The sequencer 120 maintains a "next ticket" number 136, which represents the ticket number of the next thread 126 to be allowed to execute. The await 154 method waits for the invoking thread's ticket number 125 to become available (i.e., become greater than or equal to the next ticket number 136), and returns control to the thread 124 when the invoking thread's ticket number 125 is available. The sequencer 120 can disable the thread 124 for scheduling purposes, so that the thread will not unnecessarily consume processor time while waiting for its ticket number. When the thread's ticket is available, the application code 108 can execute the critical section 114, followed by the application's post-critical section code 116, which invokes the sequencer's advance method 156 to advance the next ticket value 136, thereby allowing another thread 126 waiting on the next ticket value to execute. Thus the "next ticket" number is advanced by invocations of the sequencer's advance method 156 by the application after the application completes the critical section 114. Advancing the "next ticket" number causes the sequencer 120 to allow another thread 126 associated with the "next ticket" number to execute the critical section (e.g., by enabling the thread for scheduling and allowing the thread's call to await to return) when thread 124 invokes the sequencer's advance method 156 after exiting the critical section 114.

As introduced above, in one set of embodiments, application code 108 or other program code instructions request access to a critical section 114 by presenting a particular ticket number 125 to the sequencer 120. Each of the threads 123 in the application can be associated with a ticket number 125 that is unique among the threads 123 of the application, and when one or more of the threads 123 request access to the critical section 114, the sequencer 120 grants one or more of the requests that are associated with ticket values 125 less than or equal to the "next ticket" value 136. Furthermore, the sequencer 120 blocks, i.e., delays, requests from threads 123 that have ticket values greater than the next ticket value 136 until the "next ticket" value 136 advances to (becomes greater than or equal to) the ticket values 125 associated with those requests.

For example, when the application invokes the await method 154 prior to entering the critical section 114 to wait for a specified ticket value to be reached, the sequencer can block an application's request (e.g., await call) by disabling execution of the thread associated with the request, and, if a ticket value associated with a previously-blocked request has been reached (e.g., as a result of an advance call), grant a previously-blocked request by enabling execution of the thread associated with the previously-blocked request. The next ticket value 136 advances when the application code 108 invokes the advance method of the sequencer 120 to increment the next ticket value 136 by a specified increment value 138 (e.g., by 1 to indicate that one thread has completed the critical section 114). Thus, to achieve ordered execution of application requests, the requests are associated with unique numbers 125, and the requests are granted in the order specified by the associated numbers 125. By blocking the application thread 124 until the thread's ticket number 125 is reached, the sequencer 120 prevents execution of the critical section 114 by the thread 124 until requests for the critical section 114 by threads with lower ticket numbers are complete.

The application's post-critical section code 116 should invoke the sequencer's advance method immediately or soon after executing the critical section 114, e.g., as the next method invocation after the critical section 114. The advance method increments the next ticket value 136 by a specified increment value. The sequencer 120 then grants any waiting requests associated with ticket values, up through the new next ticket value 136, in the order of their associated ticket values 135. In one or more embodiments, multiple requests (e.g., invocations of the await method) can be associated with the same ticket value 135, in which case the multiple requests are granted when the associated ticket value is reached by the sequencer 120, but the order in which the requests are granted is undefined (e.g., any order may be selected by the sequencer).

In one or more embodiments, the sequencer 120 uses a waiting list 140 to store the ticket numbers 160 for which threads 123 are waiting, along with the thread identifiers 162 of the corresponding waiting threads 123. The waiting list 140 can be represented as a linked list data structure, an array, a queue, or other structure. For purposes of explanation, the waiting list 140 is described herein as a linked list that is referenced by a head pointer. The terms waiting list 140 and waiting list head 140 are used interchangeably herein to refer to the waiting list, since the head pointer points to the first element 142 of the waiting list. The await method 154 creates a waiting list element 142 for each request, and inserts the list element 142 into the list such that the list remains in sorted order, e.g., by inserting the new list element 142 into the list immediately after the last list element that has a ticket value less than the new list element's ticket value 160 using a search of the list. The search starts at the head 140 to find the insertion point, and the next pointers 164 in the affected list elements 142 are updated appropriately to insert the new list element 142 into the list 140. The list element 142 may be, for example, an instance of a data structure that has a ticket number attribute 160, a thread identifier attribute 162, and a next pointer or reference 164 that refers to the next list element, or is null if the list element 142 is the last element in the list.

In one or more embodiments, the await method 154 operates as follows. First, the await method determines if the requested ticket number 125 is greater than the next ticket number 136, and, if so, creates a new list element 142 that references or stores the ticket number 125 passed by the application 108 in a ticket number field 160. The await method also stores the thread identifier 124 of the thread that invoked the await method in a thread identifier field 162. The await method then enqueues the new list element 142 in the waiting list 140 such that the list remains in sorted order (as described above), and disables or suspends the current thread 124, so that the thread will not continue execution until such time as it is enabled by the advance 156 method. The Java™ programming language's LockSupport park method can be used, for example, to suspend the thread for scheduling purposes. The await method can proceed only after the thread is enabled for scheduling. If the LockSupport park method is used, the thread is enabled for scheduling, and execution continues by returning from the LockSupport park method after another thread calls LockSupport unpark, passing the thread identifier as the argument. The await method then enters a loop that checks whether the next ticket value 136 has reached or exceeded the requested ticket number 125 that was passed to the await method, and, if not, invokes the LockSupport park method. Thus the await method 154 does not return control to the calling thread 124 until the next ticket value 136 has reached (i.e., met or become equal to) or exceeded the requested ticket number 125, and the thread 124 is prevented from executing until the await method 154 returns.

In one or more embodiments, the advance method 156 operates as follows. Upon being invoked, the advance method 156 increments the next ticket value 136 (e.g., using the AtomicLong atomic update_methods, such as getAndIncrement, compareAndSet, and the like). The advance method then searches the waiting list 140 for the last element 142 in the list having a ticket value less than or equal to the next ticket value 136, and removes that element and all prior elements (i.e., elements having equal or lesser ticket values) from the list. The search can, for example, begin at the head 140 and proceed through the list, following the next pointers 164, until the last element having a ticket value 160 less than or equal to the next ticket value 136 is found or the end of the list (a null next pointer 164) is reached. Once the desired element is found, the list can be split into two portions by setting the head pointer 140 to the next list element 142, i.e., the element pointed to by the found element's next pointer 164. Thus the first element in the waiting list 140 having a ticket value equal to or greater than the next ticket value 136 becomes the new head of the waiting list 140. The advance method then enables the threads associated with the elements of the first portion, i.e., the elements that were removed from the list as a result of changing the head pointer, since the "next ticket" value 136 now exceeds the ticket values of those removed elements. Note that in some cases, either the first or second portion (or both) may be empty. The LockSupport unpark method can be used to enable the threads, if the LockSupport park was used to suspend them, or another thread resume method can be used to enable the threads. In one example, the threads are enabled in the order in which they appear in the waiting list, although other orders are possible.

Figure 2:
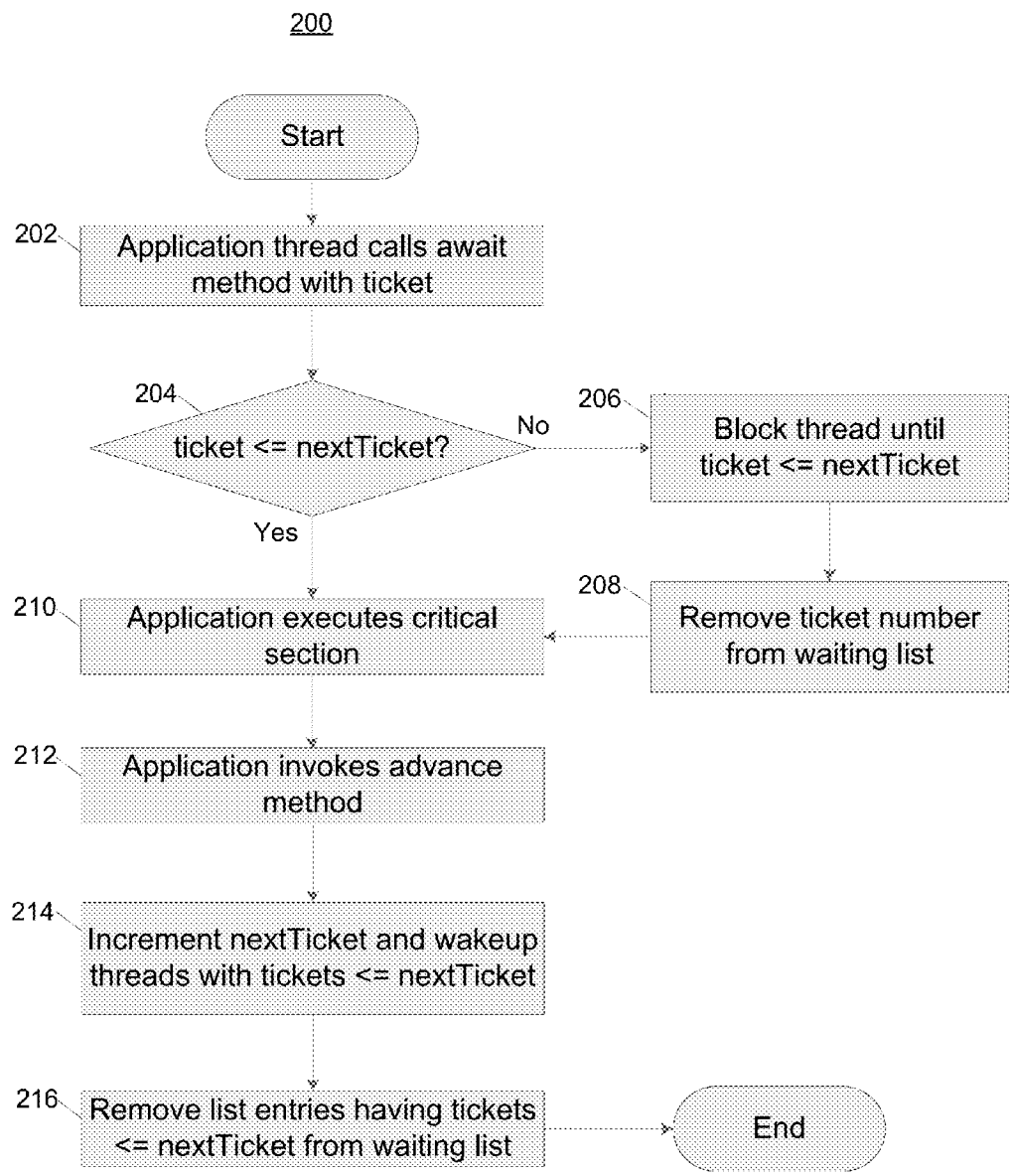
FIG. 2 is an illustrative flow diagram of interaction between an efficient sequencer system and an application in accordance with an embodiment of the present invention.

FIG. 2 is a simplified flow diagram illustrating a method 200 of interaction between an efficient sequencer and an application according to an embodiment. The processing depicted in FIG. 2 may be performed by software (executed by a processor), hardware, or combinations thereof. In one embodiment, the process of FIG. 2 is invoked when an application thread invokes the await method of an efficient sequencer, such as the sequencer 180 shown in FIG. 1. As shown at block 202, the application thread passes a ticket value to the await method. In one example, the application determines the ticket value, and ensures that different threads use different ticket values. In another example, the sequencer 180 can allocate ticket numbers to application threads. A ticket number can correspond to an application thread, but in other examples ticket numbers can correspond to other entities, and multiple ticket numbers can correspond to a single thread, or multiple threads can correspond to a single ticket number, depending on the details of the application. Block 204 determines if the ticket number received from the application in block 202 is less than or equal to the current "next ticket" value. If not, block 206 blocks, i.e., delays, the application thread until the received ticket number is greater than or equal to the next ticket number. Block 206 can disable the thread for scheduling purposes by invoking LockSupport park, some other thread suspend method, or the like, and/or perform a busy wait loop. Once the thread is woken up, e.g., by the advance method (called from a different thread), and the received ticket number is greater than or equal to the next ticket number, block 206 completes and passes control to block 208, which removes the received ticket number (and the associated thread identifier) from the waiting list. After block 208, or after block 204 if block 204 determines that the received ticket is less than or equal to the next ticket, the application executes the critical section at block 210. After completion of the critical section, the application calls the advance method at block 212. At block 214, the advance method increments the next ticket value and wakes up any other threads having ticket values less than or equal to the incremented next ticket value. Block 216 then removes list entries having ticket values less than the incremented next ticket value from the waiting list, and the method ends.

Figure 3:
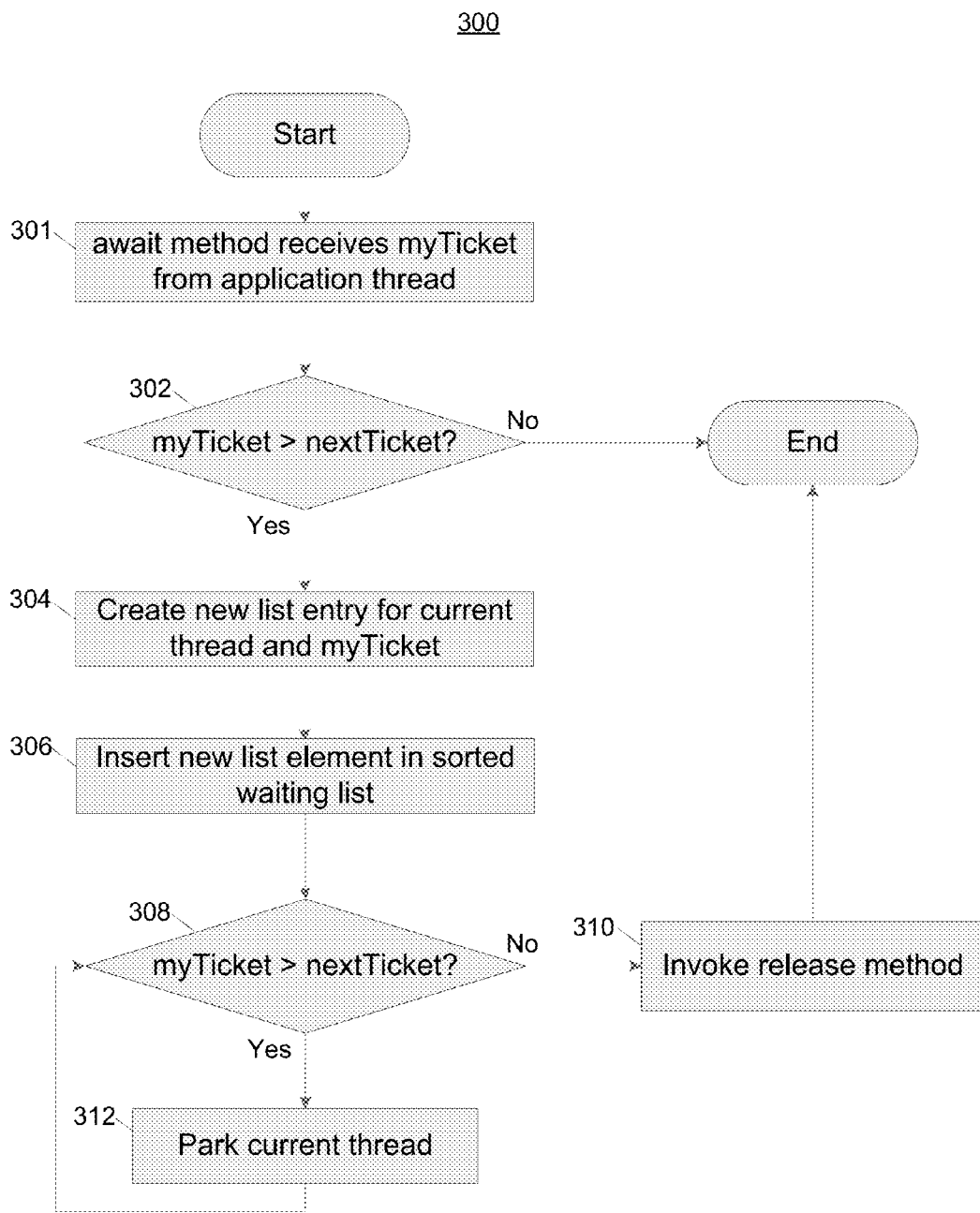
FIG. 3 is an illustrative flow diagram of a method for processing requests to access a critical section in accordance with an embodiment of the present invention.

FIG. 3 is a simplified flow diagram illustrating an "await" method 300 that processes requests to wait for a ticket to become available according to an embodiment. The processing depicted in FIG. 3 may be performed by software (executed by a processor), hardware, or combinations thereof. The method of FIG. 3 blocks the calling thread if the ticket is not available, and corresponds to the await method 154 described above with reference to FIG. 1 and can be invoked by an application, which supplies a requested ticket value, myTicket, to request exclusive access to a critical section, with access being granted when the "next ticket" value reaches the requested ticket value. The method begins at block 301, which receives a request ticket value myTicket from an application thread that has invoked the await method. Block 302 determines whether the method will block (i.e., wait, causing the invoking thread to make no progress until it is unblocked). The method will block if the requested ticket value myTicket is greater than the "next ticket" value, because the "next ticket" value has not yet reached the requested ticket value. Thus, if block 302 determines that myTicket is less than or equal to nextTicket, then the request can be granted, there is no need to block, and the method ends. Otherwise, execution continues at block 304, which creates a new list element 142 that includes a thread reference or identifier 162 set to the current thread and stores the value of myTicket in a ticket field 160.

In one or more embodiments, the waiters are stored in the waiter list in the total order of their tickets. Thus the unblocking (e.g., release) operation can be optimized to search for blocked threads only in a subset of the waiter list, reducing the wait latency compared to an implementation that would use an unsorted list of waiters. At the same time, the blocking operation (e.g., await) is slower, compared to adding a waiter to an unsorted list, but the impact of the slower blocking operation is acceptable, since the blocking thread is more likely to have no permission to proceed at the time it is adding itself to the waiter list. Therefore, block 306 inserts the new list element 142 into the waiting list 140 so that the list remains sorted by the ticket values of the elements. For example, the list can be searched starting at the head until the first element 142 having a ticket value 160 greater than the ticket value of the new list element is found or the end of the list is reached. If such an element is found, then the new list element is inserted in the waiting list immediately preceding the element that was found. That is, the new list element is inserted into the waiting list such that the existing list element is the next list element after the new list element. If such an element is not found, then the new element is inserted at the end of the list. The list insertion can be performed using a single Java AtomicReferenceFieldUpdater associated with the sequencer for updating list element "next" fields to atomically set the "next" field of the element being appended to, with no need for other thread synchronization to protect the sequencer's state. For example, the list insertion can be performed by setting variables h and n to refer to the list head and the element after the list head (h.next), respectively, then, as long as h is not null and n.ticket<myTicket, advancing h and n through the list by setting h=n and n=n.next. Once that stopping condition is true (n is null or n.ticket>=myTicket), the new element can be inserted into the waiters list between h and n by using the AtomicReferenceFieldUpdater compareAndSet method to set the value of the "next" field of h to refer to the new element if the current value of the "next" field of h is equal to n (i.e., the expected next list element; if h.next is not equal to n, then another thread has already updated h.next, and this thread does not update h.next). If the update of h.next fails (e.g., because h.next does not have the expected current value, which can occur as a result of a concurrent modification of the list by another thread), the new insertion position needs to be found. However, since the waiter list is sorted, the search can proceed from the same h, whose ticket is already known to be smaller than myTicket. Thus the same loop described above continues until an insert succeeds. There is no need to rescan the waiter list when insertion fails. Block 308 then determines if myTicket is still greater than the next ticket value 136 (in case another thread has updated the next ticket value 136 since the check at block 302). If myTicket is less than or equal to the next ticket value 136, then block 310 invokes the method of FIG. 5 to release any thread(s) that are waiting for the current next ticket value 136. Otherwise, block 312 parks the current thread, so that the thread will not execute, i.e., will not use substantial CPU time, until it is released at some future time, and the method ends. If the LockSupport park method returns, block 312 transfers control back to block 308 to determine whether myTicket has advanced past the next ticket value 136. If so, block 310 releases the waiting threads, and the method ends. If not, block 312 calls the park method again, and the loop between block 312 and 308 repeats until block 308 determines that myTicket is less than or equal to the next ticket value 136.

Figure 4:
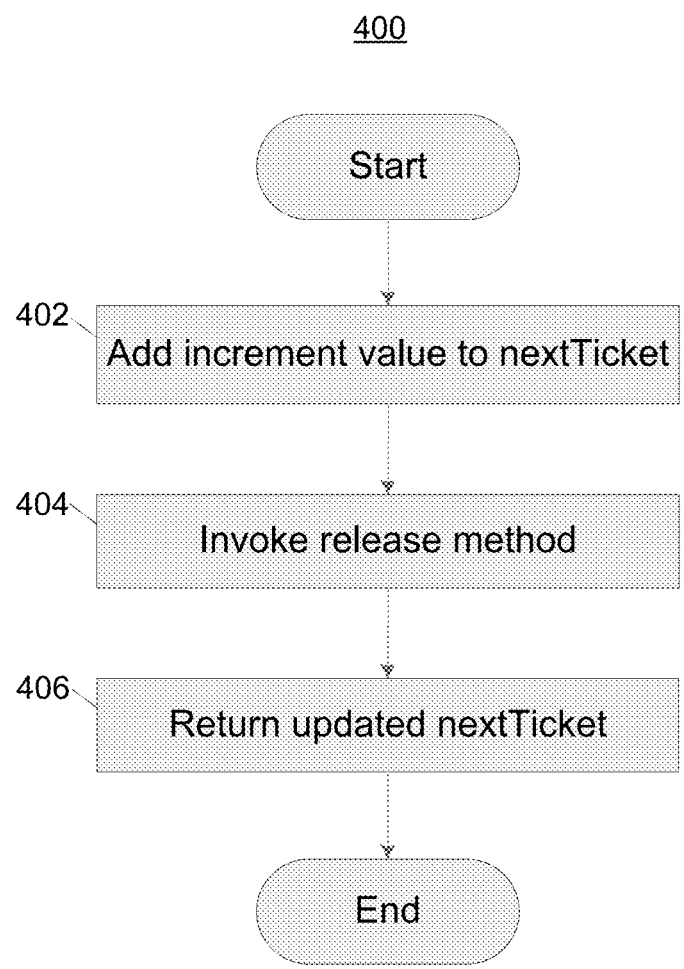
FIG. 4 is an illustrative flow diagram of a method for processing requests to advance a ticket in accordance with an embodiment of the present invention.

FIG. 4 is a simplified flow diagram illustrating an "advance" method of processing requests to advance a ticket according to an embodiment. The processing depicted in FIG. 4 may be performed by software (executed by a processor), hardware, or combinations thereof. The method of FIG. 4 corresponds to the advance method 156 described above with reference to FIG. 1 and can be invoked by an application, which can optionally supply an increment value that is to be added to the "next ticket" value. The default increment value is 1, i.e., the "next ticket" value is increased by 1 if no increment value is supplied by the application. Block 402 increases the "next ticket" value 136 by the increment value using, for example, the Java AtomicLong addAndGet method. Block 404 invokes the method of FIG. 5 to release and thread(s) that are waiting for the next ticket value. Block 406 returns the updated "next ticket" value as a result, so that the caller can verify that the value has been updated.

Figure 5:
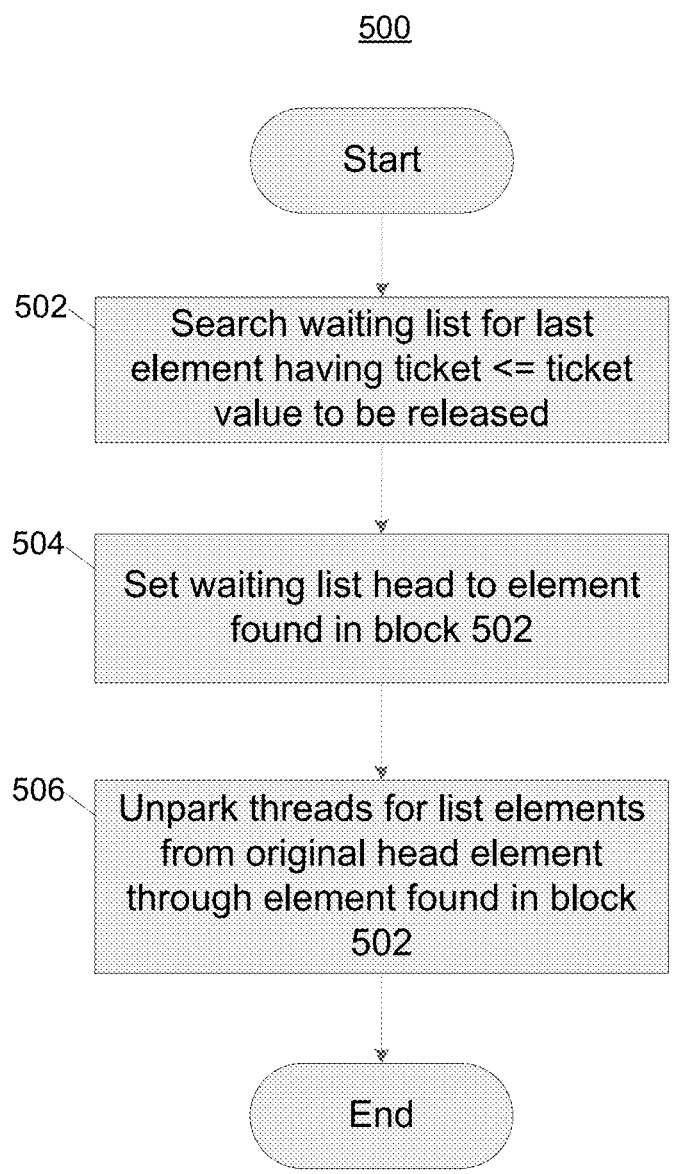
FIG. 5 is an illustrative flow diagram of a method for releasing blocked requests is accordance with an embodiment of the present invention.

FIG. 5 is a simplified flow diagram illustrating a "release" method that releases blocked requests according to an embodiment. The processing depicted in FIG. 5 may be performed by software (executed by a processor), hardware, or combinations thereof. The release method of FIG. 5 releases, i.e., unblocks, blocked requests for one or more ticket numbers (if any) up to a given ticket value t, re-enables the corresponding threads, and removes the corresponding list elements from the waiting list. This release method is shown in FIG. 1 as a release method 172. The release method can be invoked by, for example, the await method 154 or the advance method 156. If the waiting list elements were to be stored without sorting, then searching for eligible waiters would involve scanning the entire list and performing an atomic operation for every element being removed from the list. If the waiters were organized in a singly-linked list, as is the common practice for synchronization primitives, both the blocking and unblocking threads would contend to modify the "next" field of the elements. Thus the search for eligible waiters is optimized by storing the waiters in sorted order according to their tickets, and uses just one atomic operation to update the list. Since the waiting list elements are stored in sorted order (sorted by their ticket values), with the list head having the smallest ticket value in the list, removing the one or more list elements that have ticket numbers less than or equal to t can be accomplished efficiently by setting the list head pointer 140 to the last list element that has a ticket value less than or equal to t. This list element which is to become the new list head 140 is identified at block 502 using the aforementioned list search technique, and the head pointer is set to this list element at block 504. The new list head element will then have a ticket value less than or equal to t, and any threads entering await with the ticket greater than t will frequently add themselves in the portion of the list after the new head. The threads entering await, concurrently with the release, with the ticket(s) less than or equal to t will only add themselves in the portion of the list preceding the new head. There is a small chance that the threads entering await will observe that the next ticket is less than myTicket, but start inserting the element in the waiter list after another thread advances the ticket and releases all eligible waiters that were already in the list. Sequential consistency between blocks 306 and 308 ensures that even in such cases the thread in await will not block indefinitely, and will remove the newly-added element from the waiter list. There is no need to rescan the waiter list when release finds only a subset of waiters (i.e., more eligible waiters become visible after release ends). This design reduces contention on head of the waiter list and next fields, as await only updates next, and advance only updates head, and the threads that add their elements to the waiter list after the other thread advanced the ticket do not contend for the waiter list update, as they are more likely to observe the waiter list in a consistent state that does not require additional processing. Thus the list head points to the last waiter that was released. The list starts with a sentinel element that has a next pointer to the actual first element in the waiting list. In this way, updating of the list when enqueuing and releasing leaves the list in a consistent state. The one or more list elements 142 that are removed from the front of the list as a result of changing the head pointer 140 correspond to the requests to be released. The threads 162 associated with those requests are unparked at block 506, which traverses through the fragment of the list that was removed from the front of the list. The original head pointer (prior to the change to the new list head) identifies the head of the list fragment that is traversed at block 506. For each list element, starting at the original head pointer and continuing through the list until the new list head element that was set in block 504 is reached, block 506 unparks the thread associated with each list element by invoking the LockSupport unpark method on each thread identifier stored in each such list element, and the method ends.

To improve performance, the release method of FIG. 5 need not be protected by a method-level synchronization operation. Instead, the only operations in the method that need by synchronized with other operations is the update of the link head at block 504, which can be performed using the AtomicReferenceFieldUpdater compareAndSet operation. To achieve this improved efficiency, the search for the new list head at block 502 can be performed by setting a local variable h to the list head pointer (which other threads could modify) and moving two local variable pointers, p and n, through the waiters list 140, with n pointing to the next node after p, in a loop that ends when n points to a list element having a ticket value greater than the threshold ticket value t, or is null, indicating that the end of the list has been reached. When that search loop terminates, the value of p is compared to the initial list head variable. If p is equal to h, then the method returns, since there are no list elements to remove. Otherwise, if p is not equal to h, then a variable t is set to p's ticket value. The compareAndSet method is then invoked to set the head pointer to p. The compareAndSet method is invoked in a loop until it succeeds or the list head pointer 140 has been advanced by another method to a list element that has a ticket value greater than or equal to t, since another thread may have changed the list head pointer 140, in which case the compareAndSet method tries again with the new list head pointer 140, until it succeeds or the new list head ticket value is greater than or equal to t.

The compareAndSet method succeeds if, when invoked for the list head field of the sequencer's implementation class, with h as the expected value of the list head field and p as the new value for the list head field, compareAndSet finds that the list head value is still equal to h. Otherwise, compareAndSet fails if it finds that the list head value is not equal to h, which can happen if another thread has modified the list head field since the current thread read last its value into the h variable. Thus, in the loop, the local variable h is set to the current value of the list head pointer, and h's ticket value is compared to t. If h's ticket value is greater than or equal to t, the method ends. Otherwise, when the list head update loop terminates, block 506 executes another loop to unpark the threads of the nodes in the list fragment. This unpark loop executes while h is not equal to p, setting h=h.next, invoking LockSupport unpark on h's waiter thread field, and setting h's waiter field to null in each iteration. After this loop completes, the release method ends.

Figure 6:
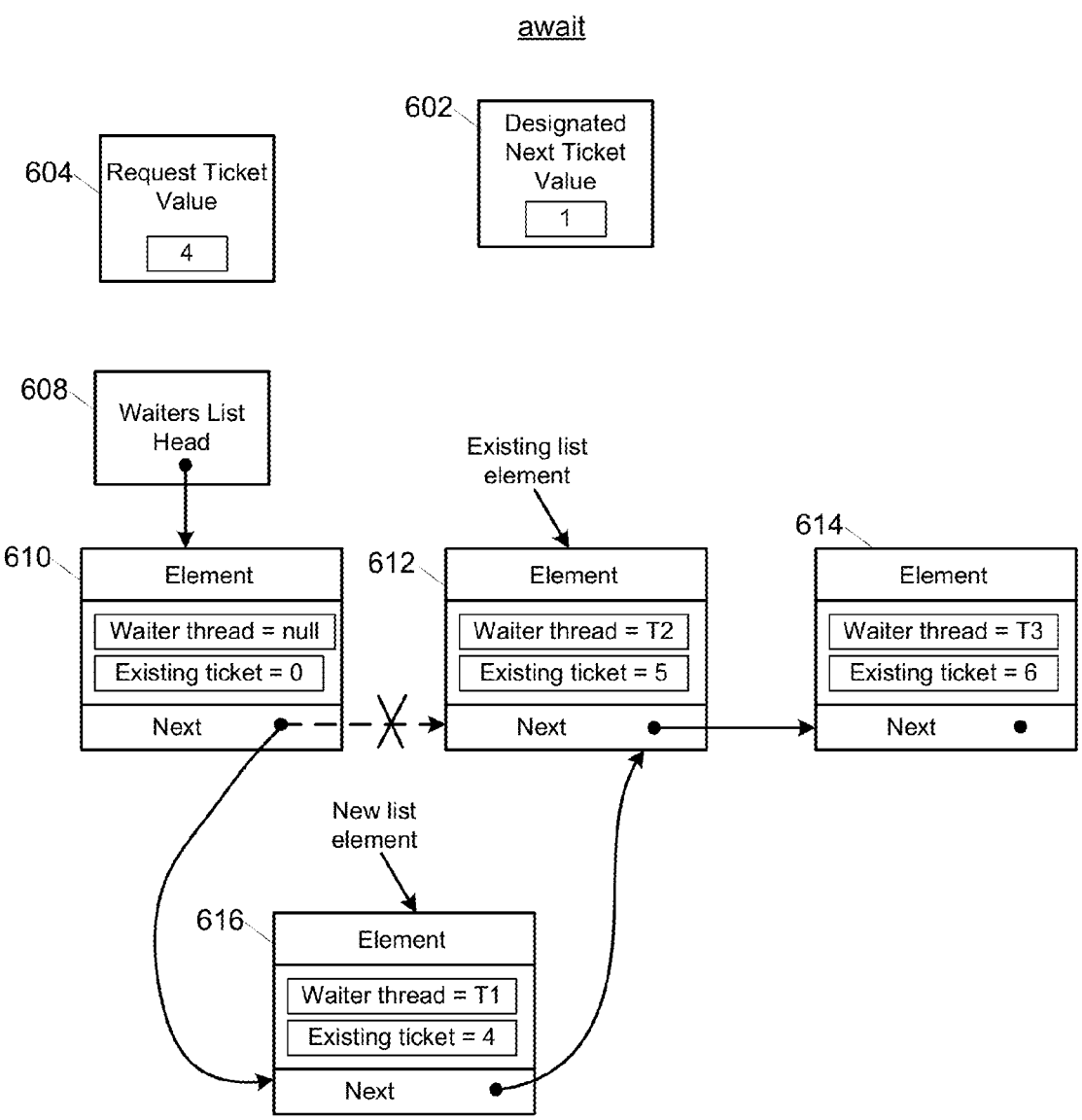
FIG. 6 is an illustrative diagram of operations performed by a method for processing requests to access a critical section in accordance with an embodiment of the present invention.

FIG. 6 is an illustrative diagram of operations performed by a method for processing requests to access a critical section in accordance with an embodiment of the present invention. FIG. 6 illustrates manipulation of the waiters list in an example execution of an await method. As described above with reference to FIG. 3, the await method inserts a new list element 616 in the sorted waiting list (block 306). FIG. 6 illustrates the state of the waiters list after insertion of a new list element 616. The await method has been invoked with a request ticket value 604 equal to 4. The designated next ticket value 602 is 1, which is less than the request ticket value (block 302), so requests with ticket values greater than 1 will block (i.e., wait), and are represented by elements of the waiters list. Thus a new list element 616 is created to represent the request ticket value 604 that would wait (block 304). A waiter list head pointer (or reference) 608 points to the first (i.e., head) element 610 in the waiters list. The element 610 stores (or points to) a waiter thread identifier (null in this example, since the head element is a sentinel element, and its waiter has been woken up in the past) and an existing ticket value (0), which represents the ticket value for which the element 610 was waiting. The element 610 also has a next pointer, which previously pointed to an existing list element 612, but has been changed by the await method to point to a new list element 616 that the await method has created (block 304) and inserted into the list (block 306) immediately preceding the first element 612 in the list having an existing ticket value greater or equal to the request ticket value of 4. The new list element 616 has been inserted into the list. The next field of the new element 616 has been set to point to the existing list element 612. There is no need to search the list past the element 612, so a subsequent list element 614 is not accessed in this invocation of the await method. Since the next ticket value 602 of 1 is still less than the request ticket value 604 of 4 (block 308), the await method also parks (i.e., suspends) the current thread (block 312), which is the thread T1 and is identified by the waiter thread attribute of the new element 616. Since block 308 has determined that myTicket>nextTicket (i.e., the request ticket 604 value of 4 is greater than the designated next ticket value 602 of 1), block 310, which invokes the release method to unblock any eligible waiters, is not executed, and the release method is not invoked.

Figure 7:
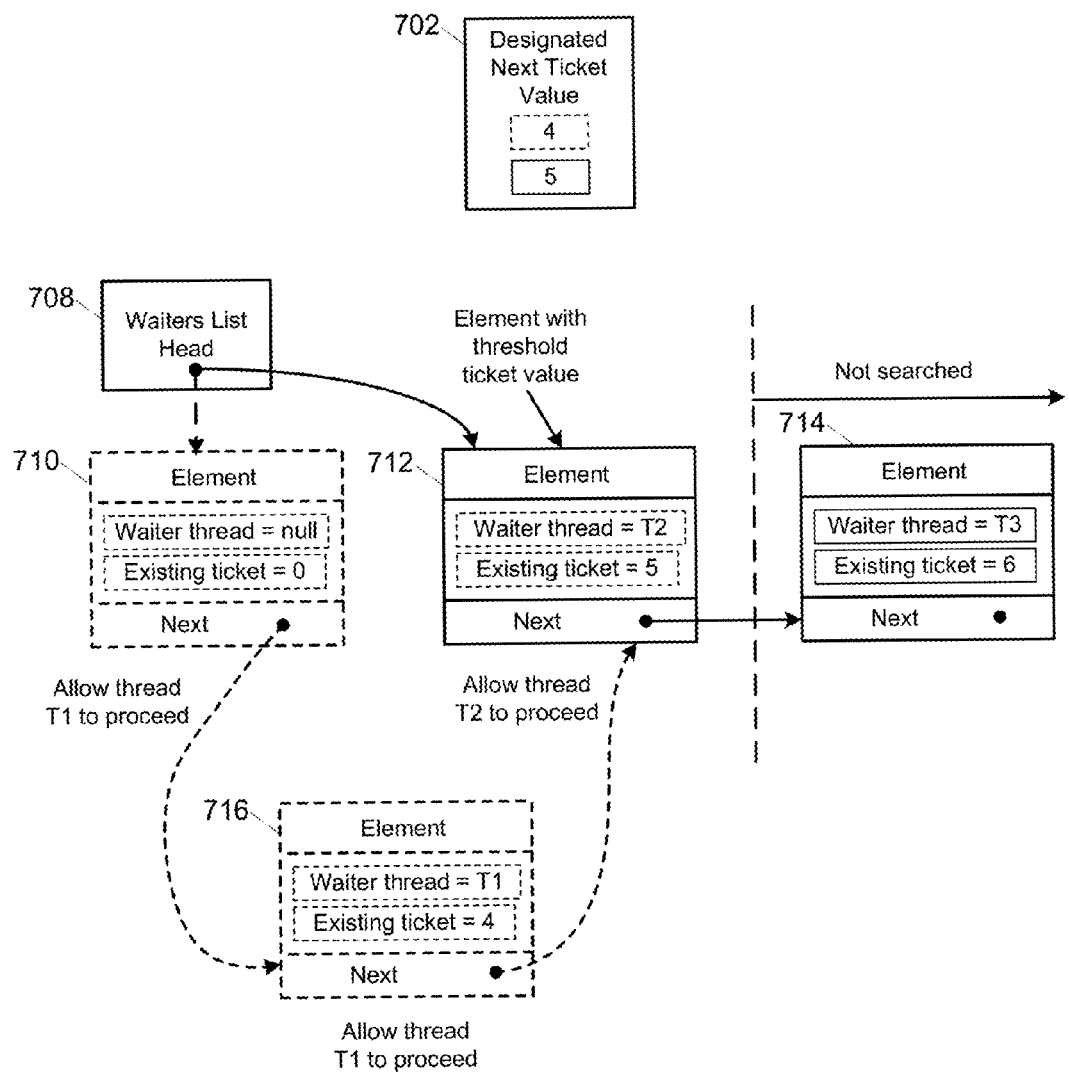
FIG. 7 is an illustrative diagram of operations performed by a method for processing requests to advance a ticket in accordance with an embodiment of the present invention.

FIG. 7 is an illustrative diagram of operations performed by a method for processing requests to advance a ticket in accordance with an embodiment of the present invention. FIG. 7 illustrates the manipulation of the waiters list in an example execution of an advance method. As described above with reference to FIG. 5, the advance method increments the next ticket value 702, and invokes the release method. The next ticket value 702 is initially 4, and is incremented to 5 by the illustrated invocation of the advance method. The release method then searches the waiters list for the last (i.e., farthest from the head of the list) element having a ticket value less than or equal to the next ticket value 702 of 5 (block 502). The element 712 is found by the search, since the element 712 has a ticket value of 5, and is the last element having a ticket value<=the designated next ticket value 702. The ticket value of element 712 (i.e., 5) is thus the threshold ticket value, and the ticket values of blocks 716 (4) and 712 (5) are referred to herein as "lesser" ticket values. The ticket value of element 710 is immaterial at this point, since element 710 is a sentinel element. The elements with the lesser ticket values are removed from the list when block 504 sets the waiters list head 708 to the element found in block 502 (i.e., element 712, which now becomes the sentinel element of the list).

There is no need to search the list past the element 712, so a subsequent list element 714 is not accessed in this invocation of the await method. Since the waiting list elements are stored in sorted order, searching for eligible waiters involves scanning from the beginning of the list until an element having the next ticket value is found. Since the difference between the previous and next ticket values is ordinarily a small constant (e.g., 1 if the application advances the next ticket value by 1 between each call to the advance method), these list operations involved in advancing the next ticket value can ordinarily be performed as constant time operations, e.g., with runtimes independent of the length of the list. Since the one or more list elements having ticket values less than (or equal to) the next ticket value are removed from the list in a single operation, a single atomic operation can be used in a multithreaded environment to update the list. There is no need to perform an atomic operation for every element being removed from the list (e.g., by the release method).

Block 712 becomes a dummy or sentinel list element, so that there is always at least one element in the waiters list during ordinary operation. In other embodiments, the list can be manipulated in different ways, e.g., block 714 could alternatively become the new head of the waiters list, with corresponding changes to the other methods, such as the await method. Thus elements 710 and 716 are removed from the list, and can be deleted from memory. The release method unparks the threads of the lesser list elements, i.e., the threads referred to by the waiter thread attributes of elements 716 and 712. These elements refer to threads T1 and T2, respectively, so threads T1 and T2 will be unparked (i.e., allowed to proceed or resume). The list updates performed by the release method are now complete, and the waiters list head 708 now points to the element 712, with the element 714 remaining in the list to represent a request for ticket value 6. The state of the list after completion of the release method is shown with the released data in dashed lines and the remaining data in solid lines.

Figure 8:
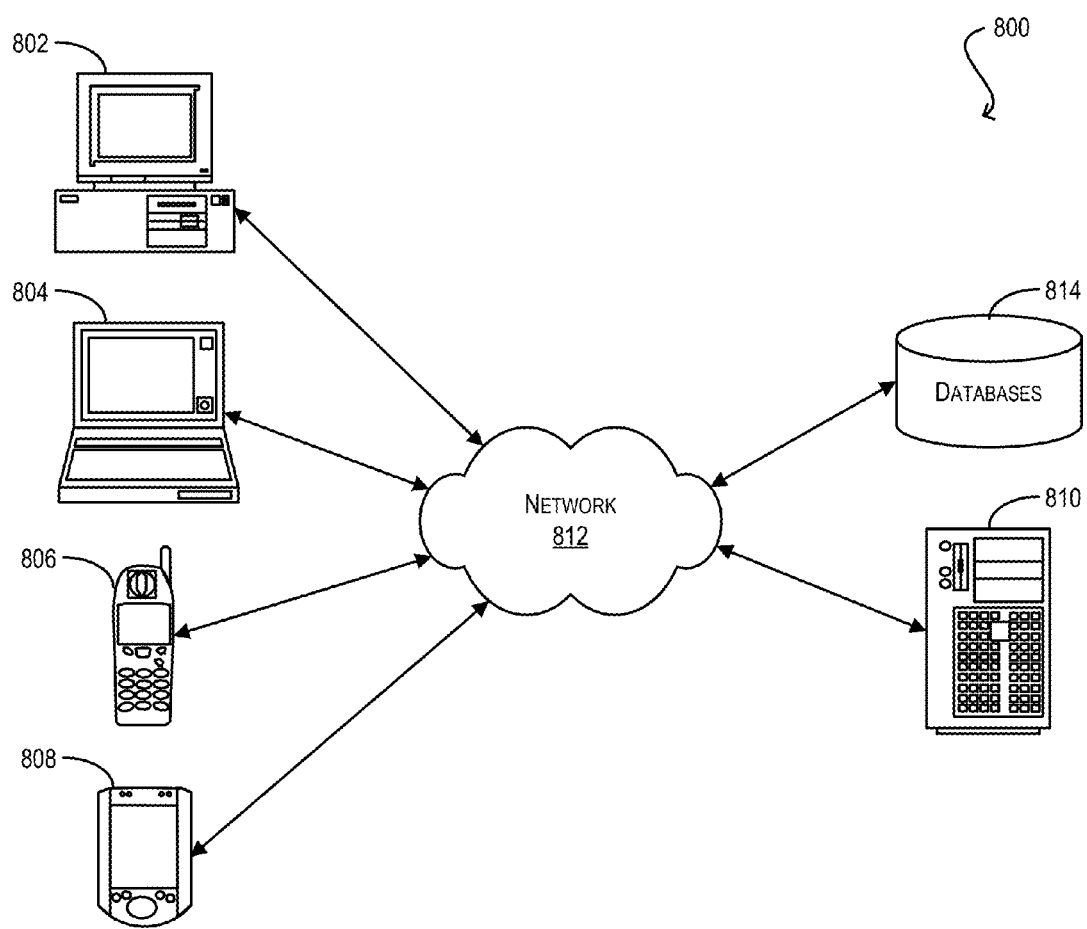
FIG. 8 is a simplified block diagram illustrating a system environment that can be used in accordance with an embodiment of the present invention.

FIG. 8 is a simplified block diagram illustrating a system environment 800 that can be used in accordance with an embodiment of the present invention. As shown, system environment 800 can include one or more client computing devices 802, 804, 806, 808, which can be configured to operate a client application such as a web browser, a UNIX/Solaris terminal application, and/or the like. In various embodiments, client computing devices 802, 804, 806, 808 can correspond to computer system 102 of FIG. 1.

Client computing devices 802, 804, 806, 808 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 can be any other electronic device capable of communicating over a network, such as network 812 described below. Although system environment 800 is shown with four client computing devices, it should be appreciated that any number of client computing devices can be supported.

System environment 800 can further include a network 812. Network 812 can be any type of network familiar to those skilled in the art that can support data communications using a network protocol, such as TCP/IP, SNA, IPX, AppleTalk, and the like. Merely by way of example, network 812 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 can further include one or more server computers 810 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Server 810 can run an operating system including any of those discussed above, as well as any commercially available server operating system. Server 810 can also run any of a variety of server applications and/or mid-tier applications, including web servers, FTP servers, CGI servers, Java virtual machines, and the like.

System environment 800 can further include one or more databases 814. In one set of embodiments, databases 814 can include databases that are managed by server 810. Databases 814 can reside in a variety of locations. By way of example, databases 814 can reside on a storage medium local to (and/or resident in) one or more of computers 802, 804, 806, 808, and 810. Alternatively, databases 814 can be remote from any or all of computers 802, 804, 806, 808, and 810, and/or in communication (e.g., via network 812) with one or more of these. In one set of embodiments, databases 814 can reside in a storage-area network (SAN) familiar to those skilled in the art.

Figure 9:
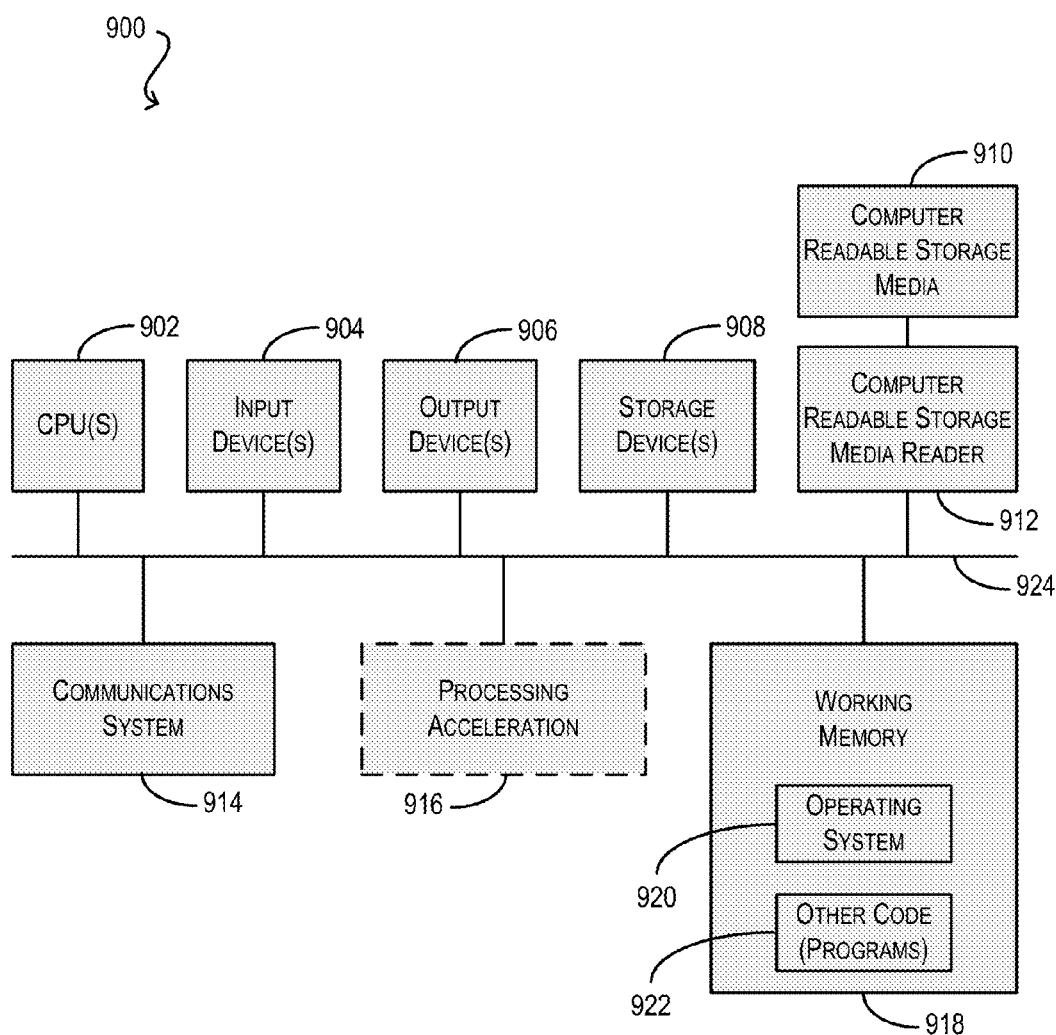
FIG. 9 is a simplified block diagram illustrating a computer system that can be used in accordance with an embodiment of the present invention.

FIG. 9 is a simplified block diagram illustrating a computer system 900 that can be used in accordance with an embodiment of the present invention. In various embodiments, computer system 900 can be used to implement any of computers 802, 804, 806, 808, and 810 described with respect to system environment 800 above. As shown, computer system 900 can include hardware elements that are electrically coupled via a bus 924. The hardware elements can include one or more central processing units (CPUs) 902, one or more input devices 904 (e.g., a mouse, a keyboard, etc.), and one or more output devices 906 (e.g., a display device, a printer, etc.). Computer system 900 can also include one or more storage devices 908. By way of example, the storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, a network card (wireless or wired), an infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 812 and/or any other computer described above with respect to system environment 800.

Computer system 900 can also comprise software elements, shown as being currently located within working memory 918, including an operating system 920 and/or other code 922, such as an application program (which may be a client application, Web browser, middle tier/server application, etc.). It should be appreciated that alternative embodiments of computer system 900 can have numerous variations from that described above. For example, customized hardware can be used and particular elements can be implemented in hardware, software, or both. Further, connection to other computing devices such as network input/output devices can be employed.

Computer readable storage media 910 for containing code, or portions of code, executable by computer system 900 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Although specific embodiments of the invention have been described above, various modifications, alterations, alternative constructions, and equivalents are within the scope of the invention. Further, although embodiments of the present invention have been described with respect to certain flow diagrams and steps, it should be apparent to those skilled in the art that the scope of the present invention is not limited to the described diagrams/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
   receiving, by a computer system, an instruction to advance a designated next ticket value;
   incrementing, by the computer system, the designated next ticket value in response to receiving the instruction;
   inserting, by the computer system, a ticket into a waiters list of tickets stored in a memory of the computer system to preserve a sorted order of a plurality of tickets in the waiters list using a value of the ticket provided by a waiter associated with the ticket, wherein the ticket in the waiters list corresponds to a thread;

searching, by the computer system, a part of the waiters list in the memory identifying the ticket as having the designated next ticket value, without searching the entire waiters list by identifying a threshold ticket value which is the greatest ticket value in the waiters list that is less than or equal to the designated next ticket value, wherein the searching starts at a waiters list head element;

removing, by the computer system, the ticket from the waiters list using a single atomic operation by one of setting the waiters list head element to refer to a next element in the waiters list after a threshold element having the threshold ticket value, and setting the waiters list head element to refer to another ticket in the waiters list; and causing, by the computer system, a thread associated with the ticket to proceed.

2. The method of claim 1, further comprising:

receiving, by the computer system, a request for a resource, the request including the value of the ticket provided by the waiter; and causing, by the computer system, the request to be blocked.

3. The method of claim 2, wherein inserting the ticket into the waiters list comprises:

searching, by the computer system, the waiters list, starting at a waiters list head element, for an existing list element associated with an existing ticket value that is greater than the value of the ticket;

inserting, by the computer system, a new list element in the waiters list such that the existing list element is the next element after the new list element; and associating, by the computer system, the value of the ticket with the new list element.

4. The method of claim 3, further comprising:

when insertion of the new list element fails because of an unexpected value of a list element next field, searching, by the computer system, the waiters list starting at the waiters list head element for the existing list element associated with the existing ticket value, and retrying the insertion.

5. The method of claim 2, wherein the request is associated with a thread of execution, the method further comprising: associating, by the computer system, the thread of execution with the value of the ticket in the waiters list.

6. The method according to claim 1, wherein the plurality of tickets are in the sorted order in which tickets having a greater ticket value are inserted into the waiters list before tickets having a lesser value.

7. The method according to claim 1, wherein the designated next ticket value corresponds to a next thread allowed to access a shared resource.

8. A system comprising:

a memory storing a designated next ticket value and a waiters list of tickets; and a hardware processor configured to:

receive an instruction to advance the designated next ticket value;

increment the designated next ticket value in response to receiving the instruction;

insert a ticket into the waiters list of tickets stored in the memory to preserve a sorted order of a plurality of tickets in the waiters list using a value of the ticket provided by a waiter associated with the ticket, wherein the ticket in the waiters list corresponds to a thread;

search a part of the waiters list identifying the ticket as having the designated next ticket value, without searching the entire waiters list by identifying a threshold ticket value which is the greatest ticket value in the waiters list that is less than or equal to the designated next ticket value, wherein the searching starts at a waiters list head element;

remove the ticket from the waiters list using a single atomic operation by one of setting the waiters list head element to refer to a next element in the waiters list after a threshold element having the threshold ticket value, and setting the waiters list head element to refer to another ticket in the waiters list; and cause a thread associated with the ticket to proceed.

9. The system of claim 8, wherein the processor is further configured to:

receive a request for a resource, the request including the value of the ticket provided by the waiter; and cause the request to be blocked.

10. The system of claim 9, wherein to insert the ticket into the waiters list, the processor is further configured to:

search the waiters list, starting at a waiters list head element, for an existing list element associated with an existing ticket value that is greater than the value of the ticket;

insert a new list element in the waiters list such that the existing list element is the next element after the new list element; and associate the request ticket value with the new list element.

11. The system of claim 9, wherein the request is associated with a thread of execution, and the processor is further configured to associate the thread of execution with the value of the ticket in the waiters list.

12. A non-transitory machine-readable medium for a computer system, the non-transitory machine-readable medium having stored thereon a series of instructions executable by a processor, the series of instructions comprising:

instructions that cause the processor to receive an instruction to advance a designated next ticket value;

instructions that cause the processor to increment the designated next ticket value in response to receiving the instruction;

instructions that cause the processor to insert a ticket into a waiters list of tickets stored in a memory of the computer system to preserve a sorted order of a plurality of tickets in the waiters list using a value of the ticket provided by a waiter associated with the ticket, wherein the ticket in the waiters list corresponds to a thread;

instructions that cause the processor to search a part of the waiters list in the memory identifying the ticket as having the designated next ticket value, without searching the entire waiters list by identifying a threshold ticket value which is the greatest ticket value in the waiters list that is less than or equal to the designated next ticket value, wherein the searching starts at a waiters list head element;

instructions that cause the processor to remove the ticket from the waiters list using a single atomic operation by one of setting the waiters list head element to refer to a next element in the waiters list after a threshold element having the threshold ticket value, and setting the waiters list head element to refer to another ticket in the waiters list; and instructions that cause the processor to cause a thread associated with the ticket to proceed.

13. The machine-readable medium of claim 12, the series of instructions further comprising:

instructions that cause the processor to receive a request for a resource, the request including the value of the ticket provided by the waiter; and instructions that cause the processor to cause the request to be blocked.

14. The machine-readable medium of claim 13, wherein the instructions that cause the processor to insert the ticket into the waiters list comprise:

instructions that cause the processor to search the waiters list, starting at a waiters list head element, for an existing list element associated with an existing ticket value that is greater than the value of the ticket;

instructions that cause the processor to insert a new list element in the waiters list such that the existing list element is the next element after the new list element; and instructions that cause the processor to associate the value of the ticket with the new list element.

15. The machine-readable medium of claim 14, the series of instructions further comprising:

instructions that cause the processor to, when insertion of the new list element fails because of an unexpected value of a list element next field, search the waiters list starting at the waiters list head element for the existing list element associated with the existing ticket value, and retry the insertion.

* * * * *

UNITED STATES PATENT AND TRADEMARK OFFICE
CERTIFICATE OF CORRECTION

| | | |
|---|---|---|
| PATENT NO. | : 9,542,236 B2 | Page 1 of 1 |
| APPLICATION NO. | : 13/340672 | |
| DATED | : January 10, 2017 | |
| INVENTOR(S) | : Oleksandr Otenko | |

It is certified that error appears in the above-identified patent and that said Letters Patent is hereby corrected as shown below:

On the Title Page

Item (54) and in the Specification, Column 1, Line 1, Title:
Replace "EFFICIENCY SEQUENCER FOR MULTIPLE CONCURRENTLY-EXECUTING THREADS OF EXECUTION" with -- EFFICIENT SEQUENCER FOR MULTIPLE CONCURRENTLY-EXECUTING THREADS OF EXECUTION--

Signed and Sealed this
Twenty-first Day of March, 2017

Michelle K. Lee
*Director of the United States Patent and Trademark Office*